United States Patent [19]
Mazelsky

[11] Patent Number: 4,742,604
[45] Date of Patent: May 10, 1988

[54] CENTRAL BELT LOCKING ASSEMBLY

[75] Inventor: Bernard Mazelsky, West Covina, Calif.

[73] Assignee: ARA, Inc., City of Industry, Calif.

[21] Appl. No.: 889,412

[22] Filed: Jul. 24, 1986

[51] Int. Cl.$^4$ ............................................. A44B 11/25
[52] U.S. Cl. ........................................ 24/574; 24/632; 24/639
[58] Field of Search .................... 24/574, 630–633, 24/636, 639, 652, 653; 280/801; 297/468, 483, 484

[56] References Cited

U.S. PATENT DOCUMENTS

| | | | |
|---|---|---|---|
| 3,617,019 | 11/1971 | Fermia | 24/631 X |
| 3,639,948 | 2/1972 | Sherman | 24/632 |
| 4,339,854 | 7/1982 | Ikesue | 24/639 X |
| 4,403,376 | 9/1983 | Palloks | 24/631 |
| 4,610,058 | 9/1986 | Stemmildt et al. | 24/574 |

FOREIGN PATENT DOCUMENTS

| | | | |
|---|---|---|---|
| 116111 | 11/1942 | Australia | 24/631 |
| 508243 | 6/1939 | United Kingdom | 24/631 |
| 847174 | 9/1960 | United Kingdom | 24/632 |
| 1022078 | 3/1966 | United Kingdom | 24/631 |

Primary Examiner—Kenneth J. Dorner
Assistant Examiner—James R. Brittain
Attorney, Agent, or Firm—Herzig & Yanny

[57] ABSTRACT

A central belt locking assembly is disclosed comprising a base plate around which an outer ring extends thereby defining a recess therebetween. An inner ring is spring mounted in the recess. A hub is mounted on the base plate within the inner ring. The hub has an annular channel adapted to receive the locking section of a belt lug. The hub cooperates with the inner ring to receive and retain the locking section of a belt lug. A release mechanism is provided to move the hub to a second open position thereby releasing the locking section of the belt lug.

5 Claims, 2 Drawing Sheets

CENTRAL BELT LOCKING ASSEMBLY

BACKGROUND OF THE INVENTION

1. Field of the Invention

This invention relates in general to certain new and useful improvements in central locking devices used with passenger restraint systems, and more particularly, to an improved central locking device capable of receiving a plurality of belt lugs and which locking device precludes inadvertent release in a variety of settings including when the locking device is subjected to out-of-plane forces.

2. Brief Description of the Prior Art

The background of the invention with respect to central locking devices is exemplified in application Ser. No. 717,965 of this inventor filed Mar. 29, 1985, since abandoned and which is incorporated herein by reference. This referenced co-pending patent application discloses the general characteristics of central locking devices but is a fundamentally distinct structure from that of the present invention disclosed and claimed herein.

Belt locking devices used with passenger restraint systems are widely employed in aircraft, and particularly, military aircraft, where the belt locking device must releasably lock a plurality of hooks or so-called "lugs" on the ends of restraint belts. In military high performance aircraft, the locking device itself must receive the lugs on the ends of shoulder harness belts and a pair of waist harness belts as well as a crotch belt. These locking devices are often referred to as "multi-point" locking devices, as for example, a five point locking device which, as its name implies, receives five belt lugs.

One of the important criteria for these belt locking devices is that they must be capable of restraining the user with regard to his seat against any stresses caused by a sudden impact, as for example, in a crash. These locking devices should not be susceptible to user induced failure modes which would cause accidental premature release of the passenger. Moreover, these locking devices must also be capable of being readily and quickly opened so that all of the latches on the various belts can be quickly released from the locking device in order to permit a rapid exit from the aircraft or other vehicle. Another requirement is that the lugs must be installed without any activation of the operating lever.

There have been several different types of restraining system locking devices used in the field of high performance aircraft and helicopters. One of the central belt locking devices which has been commonly employed is that which comprises an upper locking disk or so-called "hub" hingedly mounted with respect to a spaced apart lower plate. The combination of the hub and plate defines a peripheral gap for releasably receiving the lugs on the ends of the restraining belts. In accordance with this construction, the upper disk or hub is actually rockably mounted in such a fashion that it can be shifted upwardly or downwardly at any point relative to the lower plate in order to receive or release a belt lug at any point of entry around the periphery thereof.

One of the central locking devices of the type previously described is illustrated and described in U.S. Pat. No. 4,403,376 to Palloks. In order to achieve the universal movement of the upper disk with respect to the lower locking plate so that the size of the gap which permits entry of the belt lug can vary, the device in the Palloks patent employs a conically shaped plug which supports the locking hub or so-called "cap-like housing". The plug extends through an aperture formed in the disk and is supported by the locking plate and in turn rockably supports the hub relative to the locking plate.

Belt locking devices of the type taught in the Palloks patent have been found to be highly effective when the forces imposed on the restraining belts and locked lugs are all "in plane", that is, when the tension or force placed on the restraining belts enforce the tension or pulling forces on the locked lugs and are in a plane which is parallel to the gap of the locking device. However, devices of the type taught in the Palloks patent are not effective when "out-of-plane" forces, that is, forces which are applied at an angle to the gap, are imposed on the belt locking system. In addition, the lugs cannot be inserted without activating the operating lever in a "DON" position.

In the typical passenger restraint system, particularly when shoulder harnesses, crotch harnesses and a waist harness are employed, the forces which may be imposed on the belts in a sudden impact as in a crash will typically be out-of-plane forces. The forces imposed on the shoulder harness will be clearly at an angle with respect to the forces on the waist harness and which will again be angled with respect to the forces imposed on the crotch harness. When this occurs in devices of the type taught in the Palloks patent, there tends to be an inadvertent separation of the belt lug from the locking device. Thus, such devices have been known to fail at their most critical point of need.

The plug in these prior art locking devices must be sufficiently soft to permit the disk to be deflected or tilted sufficiently to allow a locking lug to be introduced into the gap and snap fitted in the locking device. However, the softness of the plug also gives rise to the failures mentioned above. In locking devices exemplified by the Palloks patent, the plug is sufficiently soft so as to enable the rockable movement of the disk with respect to the lower rocking plate to vary the size of the gap. However, the softness of the metal of the plug permits out-of-plane forces to tilt the hub sufficiently to allow an inadvertent separation of the lugs from their locked position. Thus, the use of such a plug achieves a desirable low degree of frictional contact, but compromises the desired locking action against out-of-plane forces.

As a result of the foregoing, a need has arisen for a new and improved locking system. Specifically, five point belt locking devices must be capable of withstanding out-of-plane loads and must not inadvertently open under any circumstances. The present invention described and claimed herein eliminates this prior art deficiency and provides a device which is capable of withstanding out-of-plane loads without inadvertently opening and virtually eliminates failures. In addition the new design eliminates the requirement of setting the operating or actuation lever to a "DON" position to allow insertion of the lugs into the buckle.

OBJECTS AND SUMMARY OF THE INVENTION

It is an object of the present invention to provide a central belt locking device of the type used with passenger restraint systems which is capable of withstanding out-of-plane loads and does not inadvertently open.

It is another object of the present invention to provide a central belt locking device of the type stated which is capable of being opened in a manner permitting quick and easy release of each of the belt lugs which are releasably locked thereto.

It is a further object of the present invention to provide a central locking device of the type stated which can be manufactured at a relatively low cost which is highly reliable in its operation and which is capable of meeting the high standards demanded of todays restraint systems. In addition, the insertion of the lugs into the buckle must not require any actuation of the operating lever.

In summary, a central belt locking assembly constructed in accordance with the present invention disclosed and claimed herein would comprise a base plate having an integral cylindrical core thereon which extends normally therefrom. A hub is slideably mounted with respect to the core and means are operatively coupled to the hub and the plug core to bias the hub against the locking base, thereby forming a peripheral gap defined by the hub and the locking base to receive and releasably lock a belt lug therein. An annular ring is spring mounted to the locking base and has a compressed position adapted to permit the belt lug's entry into the gap and a biased position preventing the removal of the belt lugs from the gap. Biasing means are provided to prevent the hub from accidentally releasing the lugs.

With the above and other objects in view, my invention resides in the novel features of form, construction, arrangement and combination of parts presently described and pointed out in the claims.

BRIEF DESCRIPTION OF THE DRAWINGS

Figure 1:
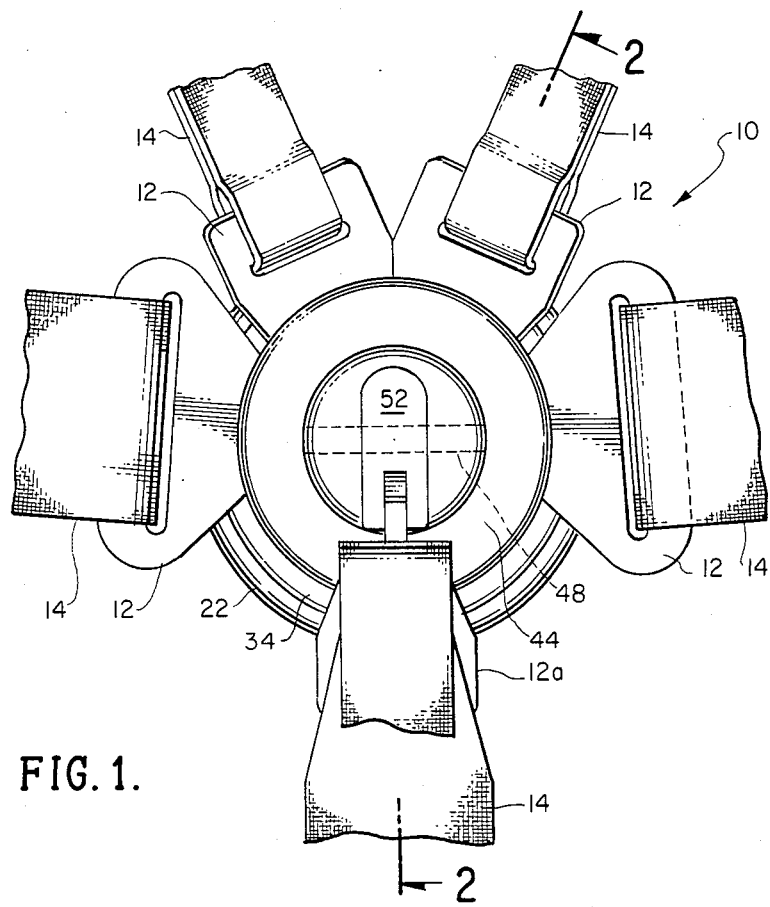
Figure 2:
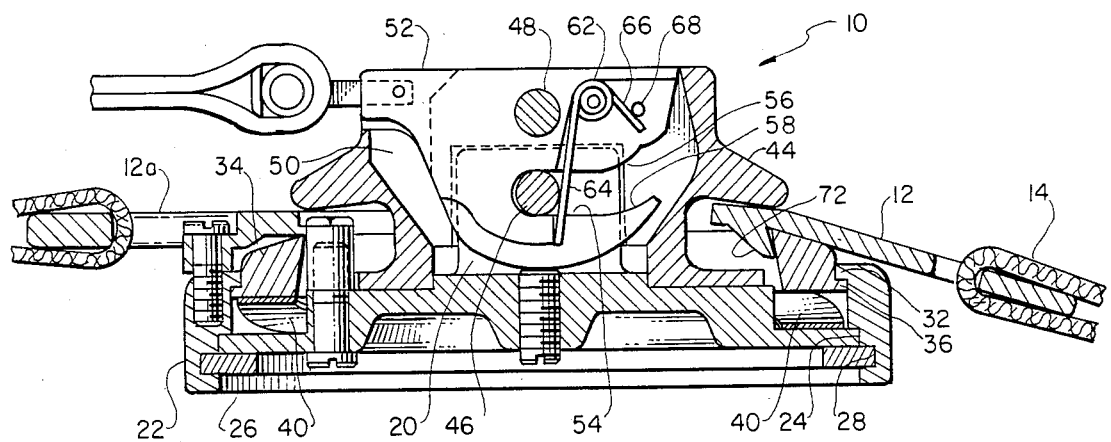
Figure 3:
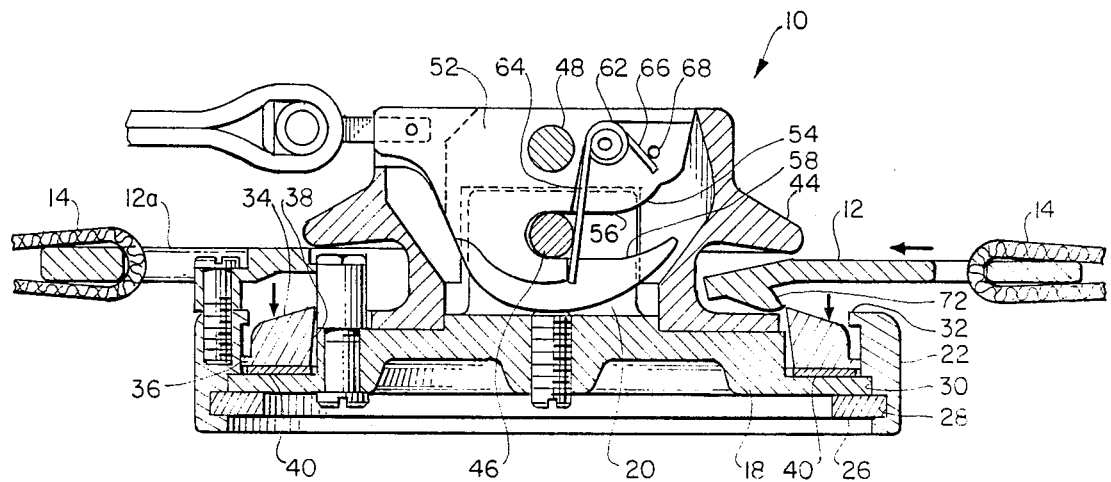
Figure 4:
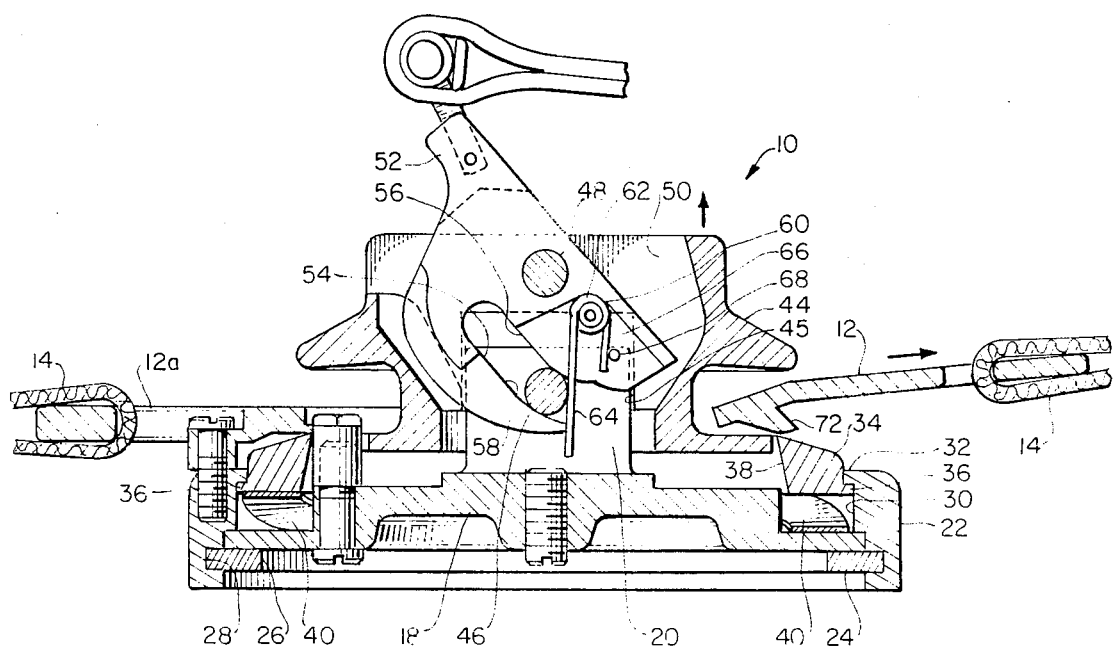

Having thus described the invention in general terms, reference will now be made to the accompanying drawings in which:

FIG. 1 is a top plan view of a belt locking device constructed in accordance with the present invention;

FIG. 2 is a partially sectioned view of the belt locking device of FIG. 1 in a first position and in a first condition;

FIG. 3 is a partially sectioned view of the belt locking device of FIG. 1 in the first position, but in a second condition; and FIG. 4 is a partially sectioned elevational view of the belt locking device of FIG. 1 in a second position.

DETAILED DESCRIPTION OF A PREFERRED EMBODIMENT

Referring now in more detail and by reference characters to the drawings which illustrate a preferred embodiment of the present invention, 10 designates a central belt locking device for use for seat restraining systems and which is highly effective and useful in high performance aircraft. However, it should be understood that the belt locking device or so-called "buckle" is not so limited and is capable of being used in any environment in which a belt lug is to be releasably locked to the belt locking device.

The buckle 10 of the present invention is designed to be used in conjunction with restraining lugs 12 shown in the drawings of the type which are associable with restraining straps 14 which may then be positioned with respect to a vehicle, such as aircraft to maintain a passenger in a desired location under any set of conditions. As can be seen from the drawings the lugs 12 are of two types designated as 12 and the sole fixed lug which is designated in the drawings as 12a.

The buckle 10 includes a generally circular base plate 18 which includes a projecting pilot 20 centrally located with respect to the base plate 18. The purpose of the pilot 20 will become more readily apparent hereinbelow. Fixed to the base plate 18 is an outer ring 22 which includes a step 24 for engaging the outer edge of the base plate 18 as shown in the drawings. The outer ring 22 is affixed to the base plate by snap ring 26 which engages the underside of the base plate 18 and fits into a recess 28 on the inwardly projecting face of outer ring 22.

The outer ring 22 is further formed to provide a inwardly projecting face 30 which terminates at inwardly projecting step 32 at the top of the outer ring 22. It should thus be understood that the outer ring 22 forms a snug fit with the base plate 18 and is retained in the position shown in the drawings by insertion of snap ring 26 during assembly of the buckle 10 according to the present invention.

Prior to attachment of the outer ring 22 to the base plate 18, an inner ring 34 which is smaller in diameter than the outer ring 22, is inserted through the center of the opening in the outer ring 22. The inner ring 34 includes an annular lip 36 which projects from the outer surface of the inner ring 34 and towards the face 30 of the outer ring. As can be seen from the drawings, the annular lip 36 of the inner ring 34 is engagable with the inwardly projecting step 32 of the outer ring 22 to prevent upward movement of the inner lip 36 in a manner which will be obvious to those of ordinary skill in the relevant art. A wave spring 40 is interposed between the inner ring 34 and the upper surface of the base plate 18 to spring bias the inner ring 34 to the position as shown in FIGS. 2 and 4. It should also be understood that limited movement of inner ring 34 with respect to the outer ring 22 and base plate 18 is permitted according to the construction described. As can be seen from the drawings, wave spring 40 is of smaller outside diameter than the inner diameter of outer ring 22.

Attached to the base plate 18 by any suitable means, as shown in the drawings, is the fixed lug 12a.

The inner surface of inner ring 34 is provided with a slanted face 38 the purpose of which will become more readily apparent herein.

Also a part of the present invention is a central hub or spool 44 which includes a central bore 45 compatible with pilot 20 to permit movement of hub 44 axially with respect to base plate 18. This can be seen further from the drawings. Pilot 20 is provided with a fixed pin 46 which remains fixed with respect to base plate 18, and hub 44 is similarly provided with a fixed pin 48 which is fixed only with respect to hub 44 and is permitted relative movement with hub 44 relative to the base plate 18, as will be more fully described hereinbelow.

Hub 44 is hogged out to include a cavity 50 which receives an operating lever 52 which is fixed for limited rotational movement to pin 48 as shown more fully in the drawings. Provided within operating lever 52 is a channel 54 having an upper contour surface 56 and a lower surface 58. As can be seen in the drawings, fixed pin 46 of the pilot 20 of the base plate 18 is received within the channel 54 of the operating lever 52. The upper contour surface 56 of the channel 54 of the operating lever 52 acts as a camming surface and interacts with fixed pin 46 to cause upward movement of hub 44 with upward movement of operating lever 52 to the position shown in FIG. 4. The lower surface 58 of the operating lever 52 acts as a constraint against excessive upward movement of hub 44 and in essence interacts with pin 46 of the pilot 20 to stop or limit upward movement of the hub 44 with movement of lever 52.

Operating lever 52 is provided with a pin spring arrangement 60 which includes a torsion spring 62. The torsion spring 62 is mounted at a fixed location on the lever arm 52 so as to be fixed relative to the lever arm 52, but permits rotation about pin 48 with movement of lever arm 52. The spring 62 includes a first downwardly projecting longer leg 64 which engages fixed pin 46, and a shorter downwardly projecting leg 66 which engages another spring pin 68 which is fixed to the operating lever 52 as shown.

Thus it can be seen by those with skill in the art, that hub 44 is permitted limited movement relative to base plate 18 by operation of lever 52. It can also be seen by those of skill in the art that the interaction of pin spring arrangement 60 with its projecting legs 64 and 66 and with fixed pins 46 and 68, causes a natural biasing of lever 52 to the downward position shown in FIGS. 1, 2 and 3. Thus, the configuration of buckle 10 according to the present invention, shown in FIG. 4, can only be achieved by manual manipulation of the operating lever 52 to the position also shown in FIG. 4. Only when the buckle 10 according to the present invention is in the configuration as shown in FIG. 4 may the lugs 12 be removed from engagement with hub 44 and the inner ring 34.

Removable lugs 12 are shown in the drawings to include a barb projection 72 which may be utilized to engage the upper surface of inner ring to push it from the upward position shown in FIG. 2 to the downward position shown in FIG. 3 to permit insertion of the lugs into the buckle 10 of the present invention. When barb 72 engages the upper surface of the inner ring 34 the movement of the inner ring 34 downwardly compresses wave spring 40 as shown in FIG. 3 until after insertion is completed, at which point in time inner ring 34 is pushed by wave spring 40 back to the upward position shown in FIG. 2. The interaction of barb 72 with the slanted inner face of inner ring 34 prevents removal of lug 12 so long as the operating lever 52 is in its naturally biased downward position shown in FIGS. 1, 2 and 3.

When the operating lever 52 has achieved its naturally donward closed position as a result of the action of torsion spring 62, as described hereinabove, with the other parts of the buckle 10, the interaction of pin 46 with the lower surface 58 of channel 54 maintains the hub 44 in the downward position as shown in FIGS. 1, 2 and 3. Manual manipulation of the operating lever 52 from the position as shown in FIGS. 1, 2 and 3 to that shown in FIG. 4 causes interaction of the upper surface of channel 54 of operating lever 52 with pin 46 and upper surface 56 acts as a cam to cause limited upward movement of the hub 44 to the position shown in FIG. 4, wherein the bottom surface of the hub 44 is even with the top of the inner ring 34 so that barb 72 of lug 12 may be removed past inner ring 34 and thus, disengagement of the restraining lugs may be achieved. Release of the operating lever 52 when in the position shown in FIG. 4 causes automatic movement of the elements of the buckle 10 to the position shown in FIGS. 1, 2 and 3, wherein the lugs may not be removed if inserted. Thus, the buckle 10 according to the present invention has only two positions, i.e., opened and closed. Accidental release of the restraining lugs 12 is thus prevented and the restraining lugs may be inserted according to the present invention into a buckle, even when the buckle is in the closed position, that is, the lugs can be inserted into the buckle without activating the operating lever 52.

Thus, there has been illustrated and described a unique and novel locking device which is highly effective with restraining systems and which is capable of precluding unauthorized release of a belt lug when attached thereto, but which also permits rapid and efficient release of a plurality of belt lugs simultaneously. Thus, the invention fulfills all of the objects and advantages which have been sought. It should be understood that many changes, modifications, variations and other uses and applications of the belt locking device will become apparent to those skilled in the art after considering the specification and the accompanying drawings. Therefore, any and all such changes, modifications, variations and other uses and applications which do not depart from the spirit and scope of the invention are deemed to be covered by the invention.

I claim:

1. A central belt locking assembly capable of receiving a plurality of belt lugs and lockably retaining same, said belt lock assembly comprising:
   a base plate;
   an outer ring extending around the periphery of said base plate;
   an inner ring concentrically spring mounted on said base plate within said outer ring;
   a spring means disposed between said base plate and said inner ring;
   a hub movably mounted on said base plate within said inner ring, having an annular channel therein adapted to receive a locking section of a belt lug;
   release means operatively coupled to said hub to bias said hub into a first closed position in which said locking section of said belt lug can be slideably engaged and retained, said belt lug in said first closed position prevented from release by a portion of said hub defining said annular channel and by said inner ring spring biased into position to engage said belt lug and prevent disengagement, and a second open position in which said locking section of said belt lug is released by said release means shifting a portion of said hub defining said annular channel thereby moving said belt lug over said inner ring allowing disengagement of said belt lug.

2. The belt lock assembly of claim 1 wherein said spring means is a wave spring.

3. The belt lock assembly of claim 1 wherein said hub of unitary construction.

4. The belt assembly of claim 3 further characterized in that said hub is capable essentially of translational motion.

5. The belt lock assembly of claim 4 further including spring means mounted in said release means for assisting in the actuation of said release means.

* * * * *